(12) United States Patent
Kim et al.

(10) Patent No.: US 11,929,079 B2
(45) Date of Patent: Mar. 12, 2024

(54) ELECTRONIC DEVICE FOR MANAGING USER MODEL AND OPERATING METHOD THEREOF

(71) Applicant: Samsung Electronics Co., Ltd., Gyeonggi-do (KR)

(72) Inventors: Taegu Kim, Gyeonggi-do (KR); Dale Noh, Gyeonggi-do (KR); Yoonju Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 400 days.

(21) Appl. No.: 17/483,292

(22) Filed: Sep. 23, 2021

(65) Prior Publication Data
US 2022/0130396 A1 Apr. 28, 2022

Related U.S. Application Data

(63) Continuation of application No. PCT/KR2021/011815, filed on Sep. 2, 2021.

(30) Foreign Application Priority Data

Oct. 27, 2020 (KR) .......................... 10-2020-0140256

(51) Int. Cl.
*G10L 17/04* (2013.01)
*G06F 3/16* (2006.01)
(Continued)

(52) U.S. Cl.
CPC .............. *G10L 17/04* (2013.01); *G06F 3/167* (2013.01); *G10L 17/02* (2013.01); *G10L 17/22* (2013.01)

(58) Field of Classification Search
CPC ......... G10L 17/04; G10L 17/02; G10L 17/22; G06F 3/167
(Continued)

(56) References Cited

U.S. PATENT DOCUMENTS

| 8,938,388 B2 * | 1/2015 | Jia .......................... G10L 15/06 704/251 |
| 8,983,849 B2 | 3/2015 | Phillips et al. |

(Continued)

FOREIGN PATENT DOCUMENTS

| JP | 2011-064913 | 3/2011 |
| KR | 10-0720023 | 5/2007 |

(Continued)

OTHER PUBLICATIONS

International Search Report dated Dec. 24, 2021 issued in counterpart application No. PCT/KR2021/011815, 9 pages.

*Primary Examiner* — Susan I McFadden
(74) *Attorney, Agent, or Firm* — The Farrell Law Firm, P.C.

(57) ABSTRACT

Disclosed is an operating method of an electronic device, including receiving a first user model from another electronic device of a user registered in the electronic device, through a communication circuit of the electronic device, refining a user model of the electronic device based on the first user model, and identifying the user based on a first voice input of the user by using the refined user model, wherein the user model is trained by the electronic device based on a second user model of at least one another user other than the user before the user is registered, and wherein the first user model is trained by the another electronic device based on a second voice input of the user obtained by the another electronic device of the user.

20 Claims, 12 Drawing Sheets

(51) Int. Cl.
*G10L 17/02* (2013.01)
*G10L 17/22* (2013.01)

(58) Field of Classification Search
USPC .......................................................... 704/206
See application file for complete search history.

(56) References Cited

U.S. PATENT DOCUMENTS

| | | | |
|---|---|---|---|
| 9,035,884 B2 | 5/2015 | Phillips et al. | |
| 10,168,800 B2 | 1/2019 | Kim et al. | |
| 10,304,463 B2 | 5/2019 | Mixter et al. | |
| 10,410,637 B2 | 9/2019 | Paulik et al. | |
| 10,748,543 B2 | 8/2020 | Mixter et al. | |
| 10,984,795 B2 * | 4/2021 | Xie | G10L 17/06 |
| 11,004,451 B2 * | 5/2021 | Kim | G10L 15/063 |
| 2005/0054381 A1 | 3/2005 | Lee et al. | |
| 2019/0050749 A1 | 2/2019 | Sanketi et al. | |
| 2019/0341056 A1 | 11/2019 | Paulik et al. | |
| 2020/0111025 A1 | 1/2020 | Hyodo et al. | |
| 2020/0075004 A1 | 3/2020 | Han | |
| 2021/0136433 A1 * | 5/2021 | Hong | H04N 21/436 |

FOREIGN PATENT DOCUMENTS

| | | |
|---|---|---|
| KR | 1020150074075 | 7/2015 |
| KR | 1020160105688 | 9/2016 |
| KR | 1020190064613 | 6/2019 |
| KR | 1020190107626 | 9/2019 |
| KR | 1020200044173 | 4/2020 |

* cited by examiner

US 11,929,079 B2

ELECTRONIC DEVICE FOR MANAGING USER MODEL AND OPERATING METHOD THEREOF

CROSS-REFERENCE TO RELATED APPLICATION(S)

This application is a bypass continuation of International Application No. PCT/KR2021/011815, which was filed on Sep. 2, 2021, and is based on and claims priority under 35 U.S.C. § 119 to Korean Patent Application No. 10-2020-0140256, which was filed in the Korean Intellectual Property Office on Oct. 27, 2020, the entire disclosure of each of which is incorporated herein by reference.

BACKGROUND

1. Field

The disclosure relates generally to an electronic device, and more particularly, to an electronic device for managing a user model and an operating method thereof.

2. Description of Related Art

Various types of input methods have been developed to enable interaction between an electronic device and a user. The electronic device may provide a voice input method for receiving a user utterance (e.g., voice). The electronic device may derive a user's utterance intent and may perform an action (e.g., the execution and function control of an application installed in the electronic device) corresponding to the utterance intent.

To provide the function, the electronic device may employ an artificial intelligence (AI) function that may perform training based on training data. Accordingly, the AI function may improve the success rate of interaction with the user as a greater amount of training data is provided.

In the prior art, when a user enters a user utterance into a new electronic device, the new electronic device fails to properly understand the user's utterance intent as compared to the user's conventional electronic device. Accordingly, the new electronic device may perform an operation that is not associated with the user's utterance intent.

In addition, for the new electronic device to properly understand the user's utterance intent, the user needs to train the new electronic device through his/her utterance.

Thus, there is a need in the art for an electronic device and associated method which properly comprehend a user's utterance, and accordingly, perform the user's intended operation.

SUMMARY

Aspects of the disclosure are to address at least the above-mentioned problems and/or disadvantages and to provide at least the advantages described below. Accordingly, an aspect of the disclosure is to provide an electronic device that is capable of providing the user's pre-trained model to a new electronic device, and an operating method thereof.

In accordance with an aspect of the disclosure, an electronic device may include a communication circuit, a processor electrically connected with the communication circuit, and a memory electrically connected to the communication circuit and the processor and configured to store a user model and instructions, wherein the instructions, when executed by the processor, cause the electronic device to receive a first user model from another electronic device of a user registered in the electronic device, through the communication circuit, refine the user model based on the first user model, and identify the user based on a first voice input of the user by using the refined user model, wherein the user model is trained by the electronic device based on a second user model of at least one another user other than the user before the user is registered, and wherein the first user model is trained by the another electronic device based on a second voice input of the user obtained by the another electronic device of the user.

In accordance with another aspect of the disclosure, an operating method of an electronic device may include receiving a first user model from another electronic device of a user registered in the electronic device, through a communication circuit of the electronic device, refining a user model of the electronic device based on the first user model, and identifying the user based on a first voice input of the user by using the refined user model, wherein the user model is trained by the electronic device based on a second user model of at least one another user other than the user before the user is registered, and wherein the first user model is trained by the another electronic device based on a second voice input of the user obtained by the another electronic device of the user.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
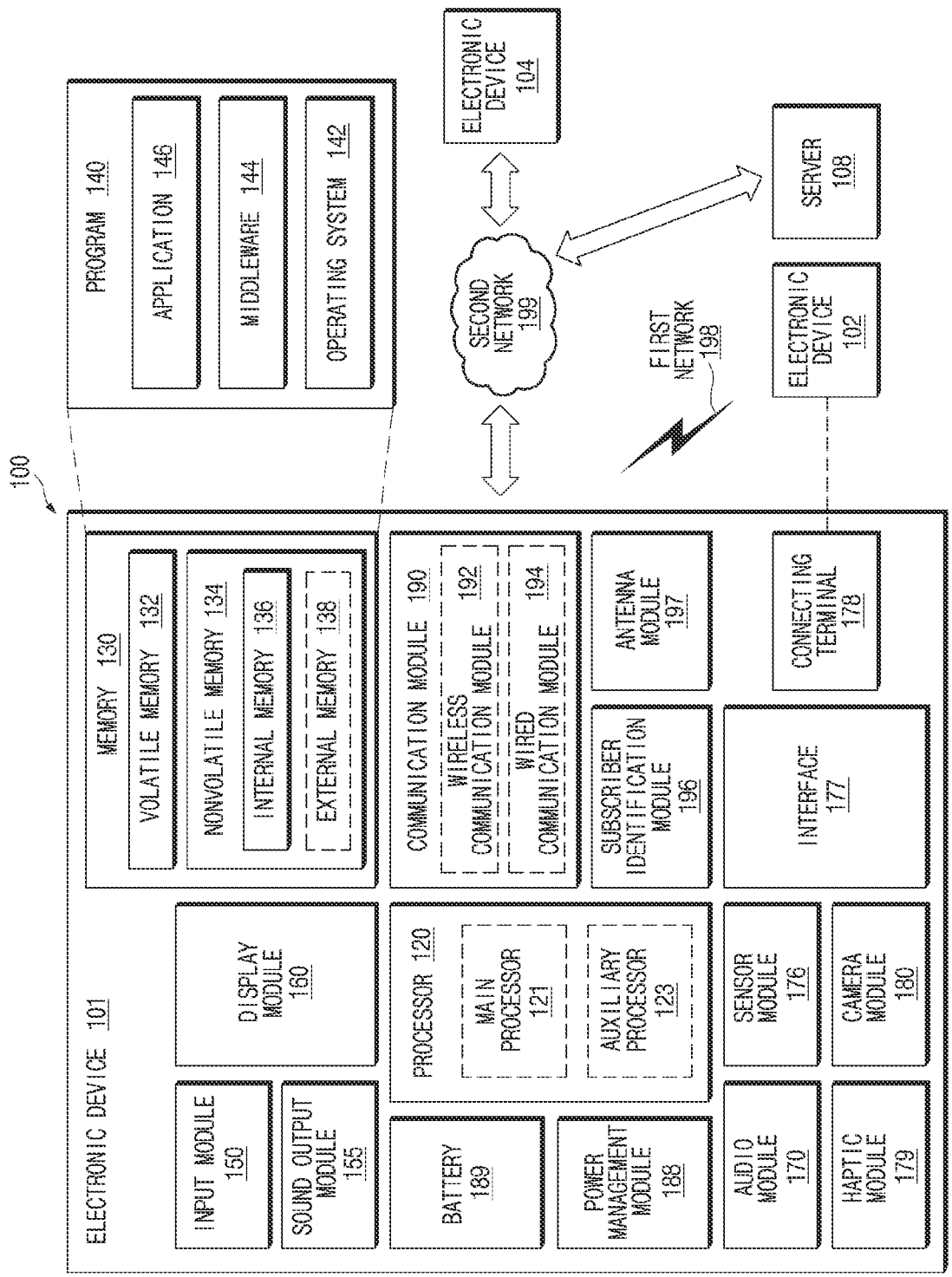
FIG. 1 is a block diagram of an electronic device in a network environment, according to an embodiment.

Hereinafter, embodiments of the disclosure will be described in detail with reference to the accompanying drawings. In the disclosure, embodiments are described in the drawings and a related detailed description is set forth, but this is not intended to limit the embodiments of the disclosure. Descriptions of well-known functions and constructions are omitted for the sake of clarity and conciseness.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
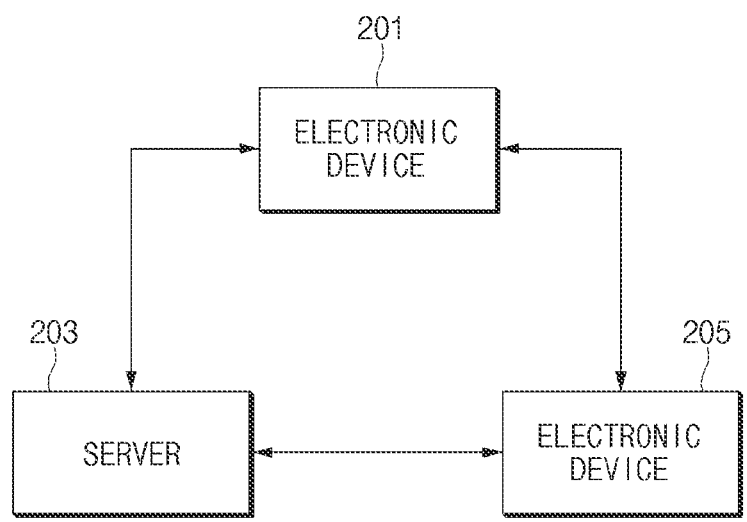
FIG. 2 illustrates electronic devices and a server, according to an embodiment.

FIG. 2 illustrates electronic devices 201 and 205 and a server 203, according to an embodiment.

Referring to FIG. 2, a communication path between the electronic device 201, the server 203, and the electronic device 205 may be formed. According to an embodiment, the electronic device 201, the server 203, and the electronic device 205 may transmit or receive data with each other by using the communication path.

According to an embodiment, the electronic devices 201 and 205 may receive a server model 451 from the server 203. According to an embodiment, the electronic devices 201 and 205 may generate user models 370 and 570 by using the server model 451. According to an embodiment, the electronic devices 201 and 205 may transmit the user models 370 and 570 to the server 203, the external electronic devices 201 and 205, or a combination thereof.

According to an embodiment, the server 203 may transmit the server model 451 to the electronic device 201, the electronic device 205, or a combination thereof. According to an embodiment, the server 203 may receive at least part of the user models 370 and 570 from the electronic device 201, the electronic device 205, or a combination thereof. According to an embodiment, the server 203 may refine (or train) the server model 451 based on at least part of the user models 370 and 570. According to an embodiment, the server 203 may provide the electronic device 205 with the user model 370 of the electronic device 201 or may provide the electronic device 201 with the user model 570 of the electronic device 205.

Figure 3:
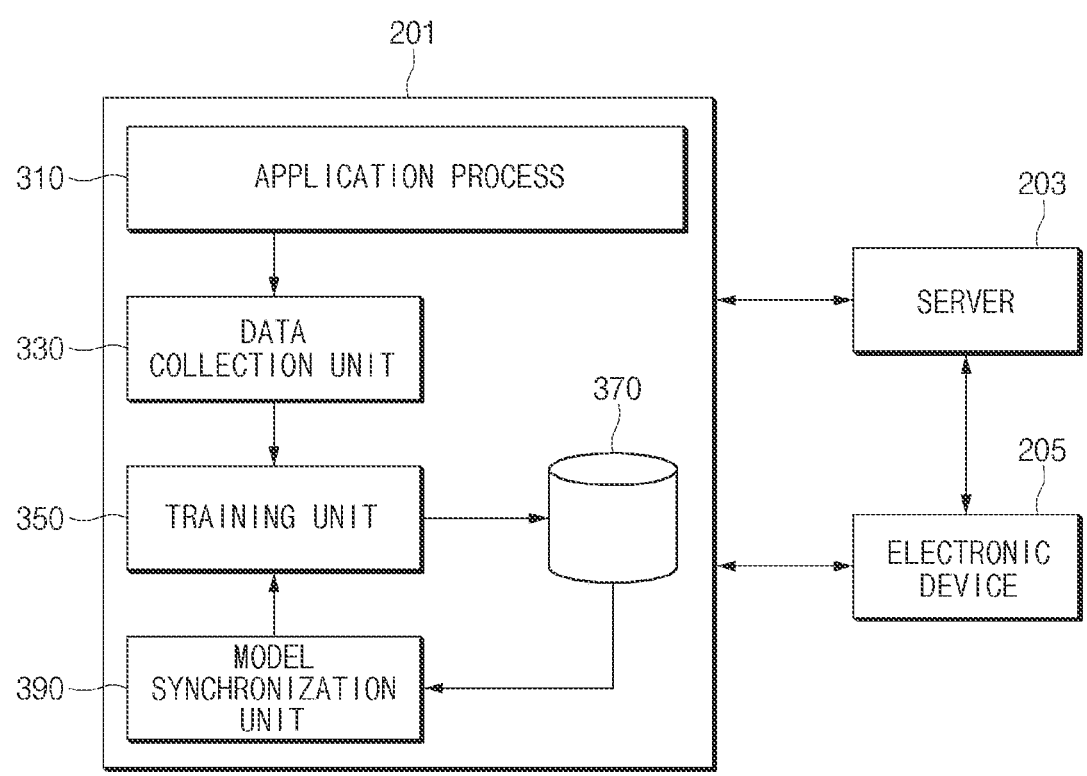
FIG. 3 is a block diagram of an electronic device, according to a first embodiment.

FIG. 3 is a block diagram of the electronic device 201, according to an embodiment. Referring to FIG. 3, the electronic device 201 may include an application process 310, a data collection unit 330, a training unit 350, the user model 370, a model synchronization unit 390, or a combination thereof.

According to an embodiment, the application process 310 may be a task of the application 146 that is running in a processor 120. According to an embodiment, the application process 310 may obtain the user's input (e.g., voice) by controlling an input module 150 (e.g., a microphone).

According to an embodiment, the application process 310 may perform a function corresponding to the user's input obtained through the input module 150. According to an embodiment, the application process 310 may provide the user with the processing result of a function corresponding to the user's input through a specified module (e.g., the sound output module 155, the display module 160, the audio module 170, the haptic module 179, or a combination thereof).

According to an embodiment, the application process 310 may provide the data collection unit 330 with at least part of the obtained inputs of the user. According to an embodiment, the application process 310 may provide the data collection unit 330 with a specified type of an input (e.g., voice) obtained through the input module 150.

According to an embodiment, the application process 310 may provide the data collection unit 330 with the function corresponding to the user's input, the processing result of the function, or a combination thereof.

According to an embodiment, the data collection unit 330 may be implemented with software that is executable by the processor 120.

According to an embodiment, the data collection unit 330 may store, in the memory 130, the user's input, the function corresponding to the user's input, the processing result of the function, or a combination thereof.

According to an embodiment, the training unit 350 may be implemented with software that is executable by the processor 120.

According to an embodiment, the training unit 350 may train the user model 370. According to an embodiment, the training unit 350 may perform machine learning on the user model 370.

According to an embodiment, the training unit 350 may train the user model 370 by using data collected through the data collection unit 330. According to an embodiment, the training unit 350 may perform supervised training, unsupervised training, semi-supervised training, reinforcement training, or a combination thereof on the user model 370 by using the data collected through the data collection unit 330.

According to an embodiment, the training unit 350 may train the user model 370 based on server data 450 obtained from the server 203. According to an embodiment, the training unit 350 may train the user model 370 through a numerical computation (e.g., summation, average, or weighted average) between the server data 450 and the user model 370. According to an embodiment, the training unit 350 may change values of a plurality of layers (e.g., parameters such as weights or activation functions) included in the user model 370 based on the server data 450.

According to an embodiment, the training unit 350 may refine a plurality of the layers included in the user model 370 through the training of the user model 370.

According to an embodiment, the user model 370 may consist of at least one AI model associated with the user.

According to an embodiment, the user model 370 may include the AI model for identifying the user based on the user's voice input. According to an embodiment, the user model 370 may include the AI model for converting the user's voice input into text data. According to an embodiment, the user model 370 may include the AI model for identifying a function based on the text data. According to an embodiment, the user model 370 may include the AI model for performing the identified function.

According to an embodiment, the model synchronization unit 390 may be implemented with software that is executable by the processor 120.

According to an embodiment, the model synchronization unit 390 may provide the user model 370 to the server 203. According to an embodiment, the model synchronization unit 390 may provide the server 203 with at least some data of the user model 370.

According to an embodiment, the at least some data may include a value (e.g., parameters (e.g., weight) or activation functions) indicating at least one layer of the user model 370.

According to an embodiment, the at least some data may include an offset value of a layer refined depending on training. According to an embodiment, the offset value may be a difference value between a layer of the user model 370 before training and a layer of the user model 370 after training.

According to an embodiment, the model synchronization unit 390 may obtain the server data 450 from the server 203. According to an embodiment, the server data 450 may be used to train the user model 370. According to an embodiment, the server data 450 may include the server model 451 of the server 203, at least one parameter 455 of the server model 451, or a combination thereof.

Figure 4:
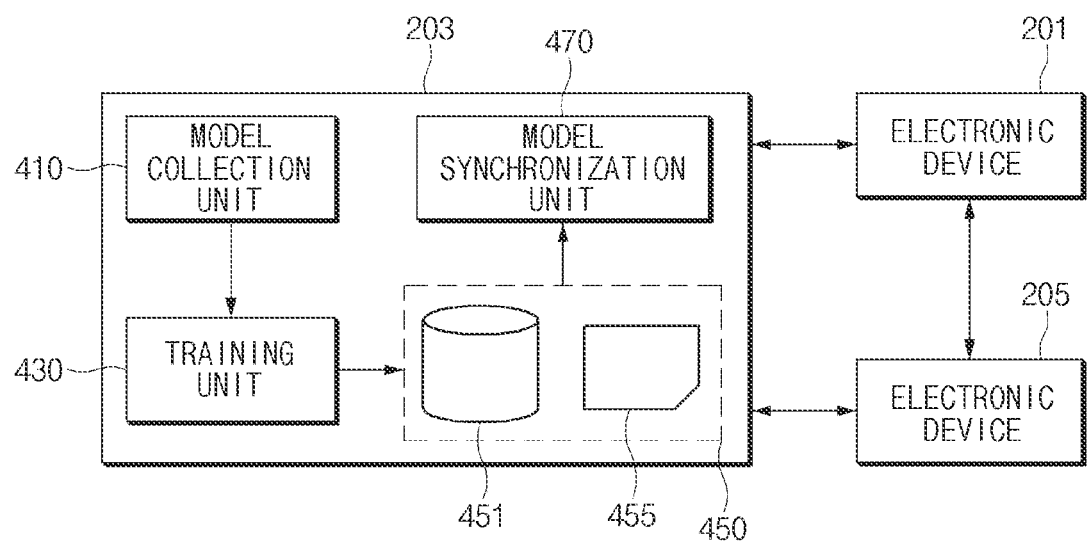
FIG. 4 is a block diagram of a server, according to an embodiment.

FIG. 4 is a block diagram of the server 203, according to an embodiment. Referring to FIG. 4, the server 203 may include a model collection unit 410, a training unit 430, the server data 450, a model synchronization unit 470, or a combination thereof. The server data 450 may include the server model 451, the parameter 455, or a combination thereof.

According to an embodiment, the model collection unit 410 may be implemented with software that is executable by the processor 120 of the server 203.

According to an embodiment, the model collection unit 410 may obtain a user model 370 or 570 from at least one electronic device that has a communication path with the server 203.

According to an embodiment, the training unit 430 may be implemented with software that is executable by the processor 120.

According to an embodiment, the training unit 430 may refine (or train) the server model 451 based on the user models 370 and 570 obtained from at least one of the electronic devices 201 and 205.

According to an embodiment, the training unit 430 may refine a plurality of layers included in the server model 451 through the training of the server model 451.

According to an embodiment, the model synchronization unit 470 may be implemented with software that is executable by the processor 120.

According to an embodiment, the model synchronization unit 470 may provide the server data 450 to at least one of the electronic devices 201 and 205. According to an embodiment, the model synchronization unit 470 may provide the server model 451, the parameter 455, or a combination thereof to at least one of the electronic devices 201 and 205. According to an embodiment, the parameter 455 may include an offset value of a layer refined depending on the refining (or training) of the server model 451. According to an embodiment, the offset value may be a difference between the layer of the server model 451 before training and the layer of the server model 451 after training.

Figure 5A:
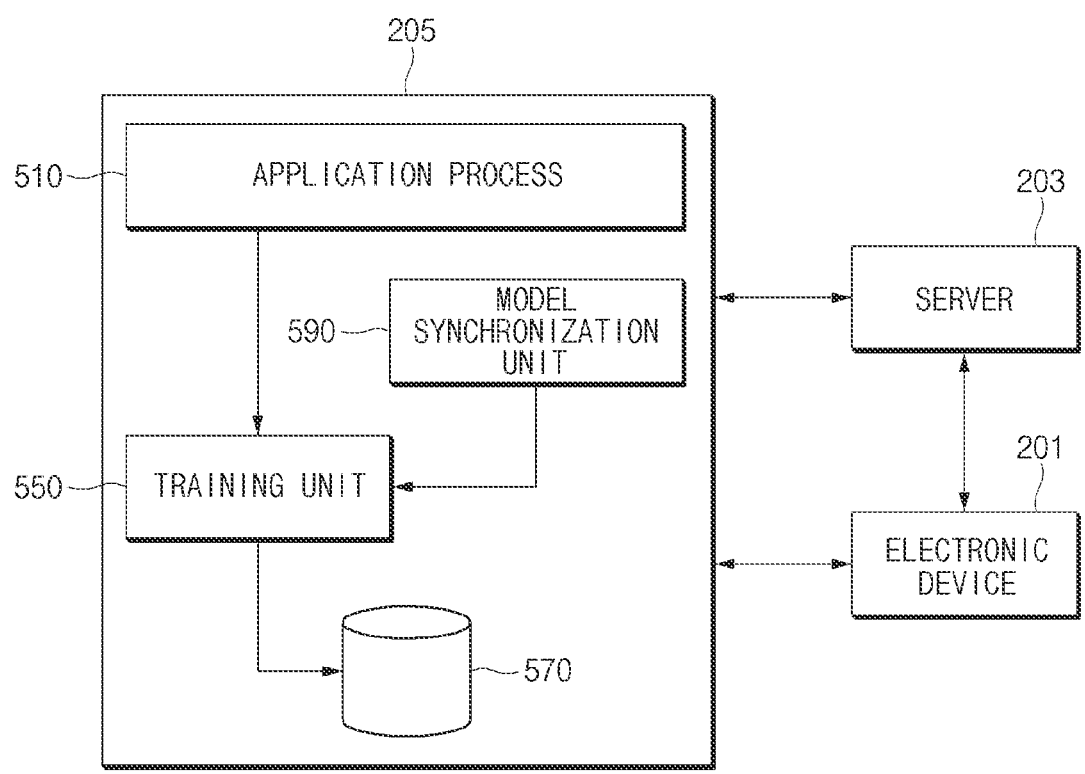
FIG. 5A is a block diagram of an electronic device, according to a second embodiment.

FIG. 5A is a block diagram of the electronic device 205, according to an embodiment. Referring to FIG. 5A, the electronic device 205 may include an application process 510, a model synchronization unit 590, a training unit 550, the user model 570, or a combination thereof.

According to an embodiment, the application process 510 may be a task of the application 146 that is running in the processor 120.

According to an embodiment, the training unit 550 may be implemented with software that is executable by the processor 120.

According to an embodiment, the training unit 550 may train the user model 570 based on a user model (e.g., the user model 370) obtained from the external electronic device 201.

According to an embodiment, the training unit 550 may train the user model 570 based on server data 450 obtained from the server 203.

Figure 5B:
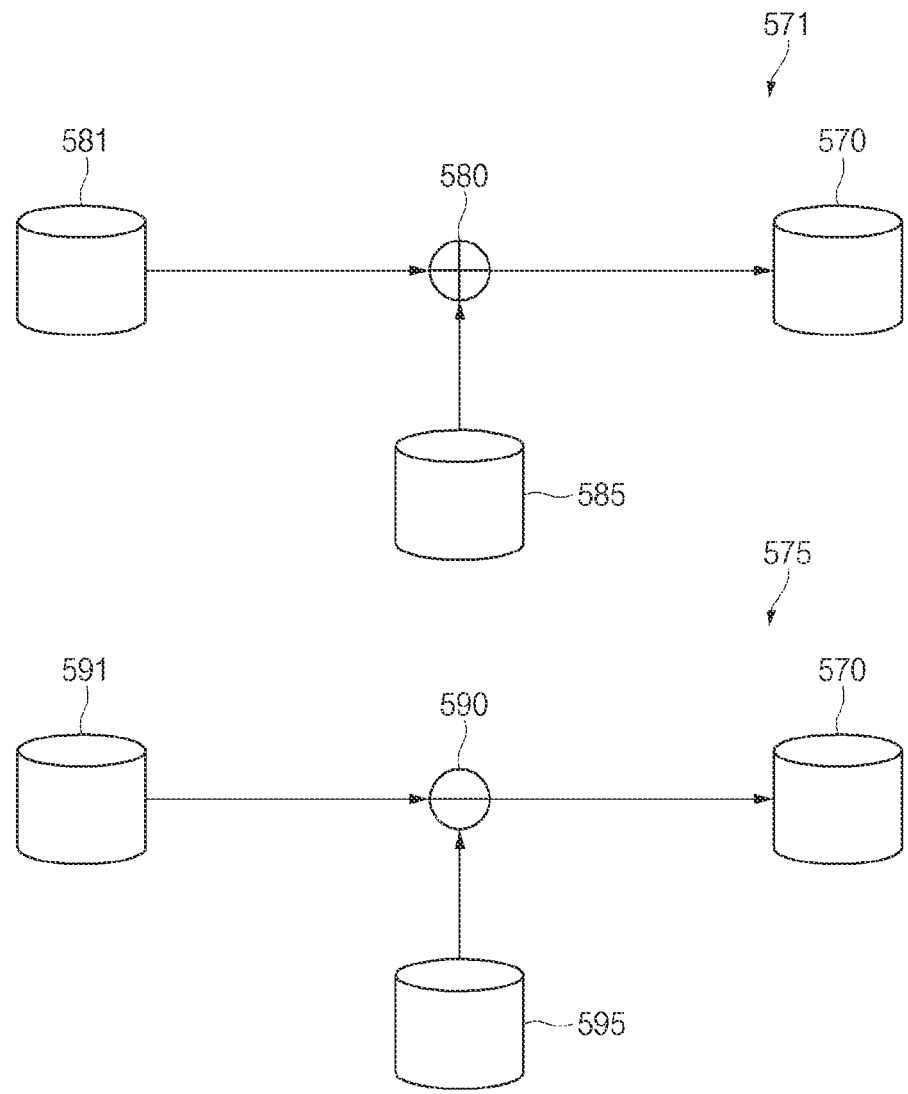
FIG. 5B illustrates training of a user model, according to an embodiment.

FIG. 5B illustrates training of a user model 570, according to an embodiment. Referring to FIG. 5B, the training unit 550 may train conventional user models 581 and 591 based on user models 585 and 595 of an external electronic device. In an embodiment, the training unit 550 may perform training 571 for increasing the influence of the user model 585 of the external electronic device in the conventional user model 581 and training 575 for decreasing the influence of the user model 585 of the external electronic device in the conventional user model 581. In an embodiment, the conventional user models 581 and 591 may indicate user models trained based on at least one user model.

In an embodiment, the conventional user model 581 may be trained as a new user model 570 based on the user model 585 of the external electronic device. In an embodiment, the conventional user model 581 may be trained as the new user model 570 through a computation 580 that strengthens the influence of the user model 585 of the external electronic device 201. In an embodiment, the computation 580 may be a numerical computation (e.g., summation, average, or weighted average) between the conventional user model 581 and the external user model 585.

In an embodiment, the conventional user model 591 may be trained as the new user model 570 based on the user model 595 of the external electronic device 201. In an embodiment, the conventional user model 591 may be trained as the new user model 570 through a computation 590 that reduces the influence of the user model 595 of the external electronic device 201. In an embodiment, the computation 590 may be a computation (e.g., subtraction or weighted average) that reduces the numerical influence of the external user model 595 in the conventional user model 591. In an embodiment, when the external user model 595 is added to the conventional user model 591, the computation 590 may be for restoring changes in parameters of the conventional user model 591.

According to an embodiment, the user model 570 may consist of user models respectively corresponding to two or more users. According to an embodiment, the user model 570 may consist of at least one AI model associated with each of two or more users.

According to an embodiment, the model synchronization unit 590 may be implemented with software that is executable by the processor 120.

According to an embodiment, the model synchronization unit 590 may correspond to the model synchronization unit 390 of the electronic device 201.

FIG. 5A illustrates that the electronic device 205 does not include the data collection unit 330 of FIG. 3, but this is only an example. According to an embodiment, the electronic device 205 may include the data collection unit 330 of FIG. 3. According to an embodiment, when the electronic device 205 includes the data collection unit 330 of FIG. 3, the electronic device 205 may refine (or train) the user model 570 based on a user input (e.g., an utterance).

Figure 6:
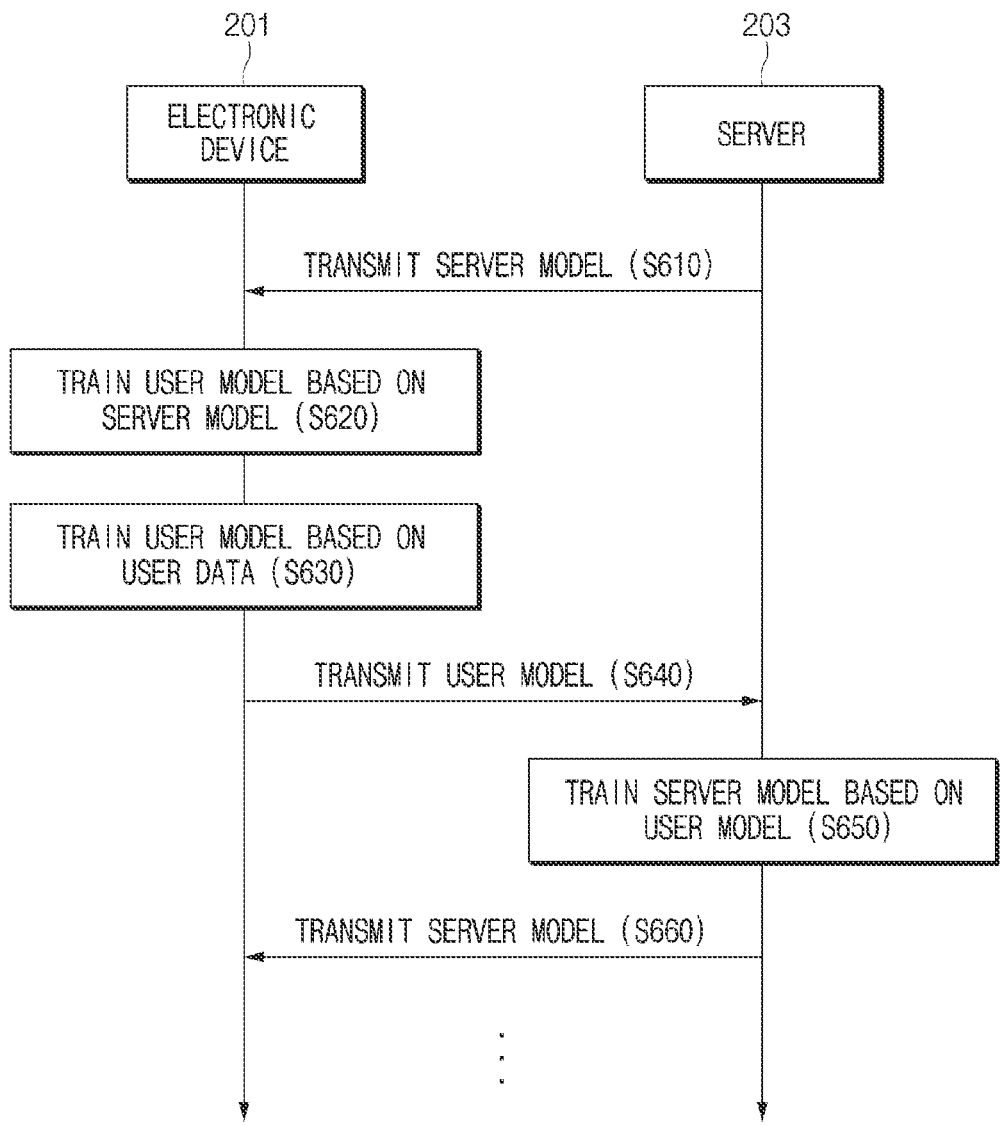
FIG. 6 illustrates a training operation of an electronic device and a server, according to an embodiment.

FIG. 6 illustrates a training operation of the electronic device 201 and the server 203, according to an embodiment.

In step S610, the server 203 may transmit the server model 451 to the electronic device 201.

In step S620, the electronic device 201 may train the user model 370 based on the server model 451. According to an embodiment, the electronic device 201 may train the user model 370 through a numerical computation (e.g., summation, average, or weighted average) between the server model 451 and the user model 370. According to an embodiment, the electronic device 201 may train the user model 370 through the numerical computation between at least one layer of the server model 451 and at least one layer of the user model 370.

In step S630, the electronic device 201 may train the user model 370 based on user data. According to an embodiment, the user data may include a user's input (e.g., voice), a function corresponding to the user's input, a processing result of the function, or a combination thereof.

According to an embodiment, the electronic device 201 may perform supervised training, unsupervised training, semi-supervised training, reinforcement training, or a combination thereof on the user model 370 by using the user data.

In step S640, the electronic device 201 may transmit the user model 370 to the server 203. According to an embodiment, the electronic device 201 may provide at least some data of the user model 370 to the server 203.

According to an embodiment, the at least some data may include a value indicating at least one layer of the user model 370. According to an embodiment, the at least some data may include an offset value of a layer refined depending on training. According to an embodiment, the offset value may be a difference value between a layer of the user model 370 before training and a layer of the user model 370 after training.

In step S650, the server 203 may train the server model 451 based on the user model 370. According to an embodiment, the server 203 may train the server model 451 through a numerical computation between the server model 451 and the user model 370. According to an embodiment, the server 203 may train the server model 451 through a numerical computation between at least one layer of the server model 451 and at least one layer of the user model 370.

In step S660, the server 203 may transmit the server model 451 to the electronic device 201.

After step S660, the electronic device 201 may train the user model 370 based on the server model 451.

In FIG. 6, the training operation of the electronic device 201 may consist of training (step S610 and step S620) based on the server model 451 and training (step S630) based on user data.

Further in FIG. 6, the training operation of the server 203 may consist of training (step S640 and step S650) based on the user model 370.

FIG. 6 illustrates that the training (step S610 and step S620) based on the server model 451, the training (step S630) based on user data, and the training (step S640 and step S650) based on the user model 370 are sequentially performed, but this is only an example. According to an embodiment, the training (step S610 and step S620) based on the server model 451, the training (step S630) based on user data, or the training (step S640 and step S650) based on the user model 370 may be performed when the respective execution condition thereof are satisfied.

According to an embodiment, the training (step S610 and step S620) based on the server model 451 may be initiated as the electronic device 201 requests the server 203 to transmit the server model 451. According to an embodiment, the training (step S610 and step S620) based on the server model 451 may be initiated after the server 203 refines (or trains) the server model 451.

According to an embodiment, the training (step S630) based on the user data may be initiated immediately after the electronic device 201 collects user data having a specified size or more. According to an embodiment, the training (step S630) based on user data may be initiated in response to a user input (e.g., a training request) of the electronic device 201.

According to an embodiment, the training (step S640 and step S650) based on the user model 370 may be initialized immediately after the server 203 collects user models, of which the number is greater than or equal to a specified number. According to an embodiment, the training (step S640 and step S650) based on the user model 370 may be initiated whenever the server 203 collects a user model.

Figure 7:
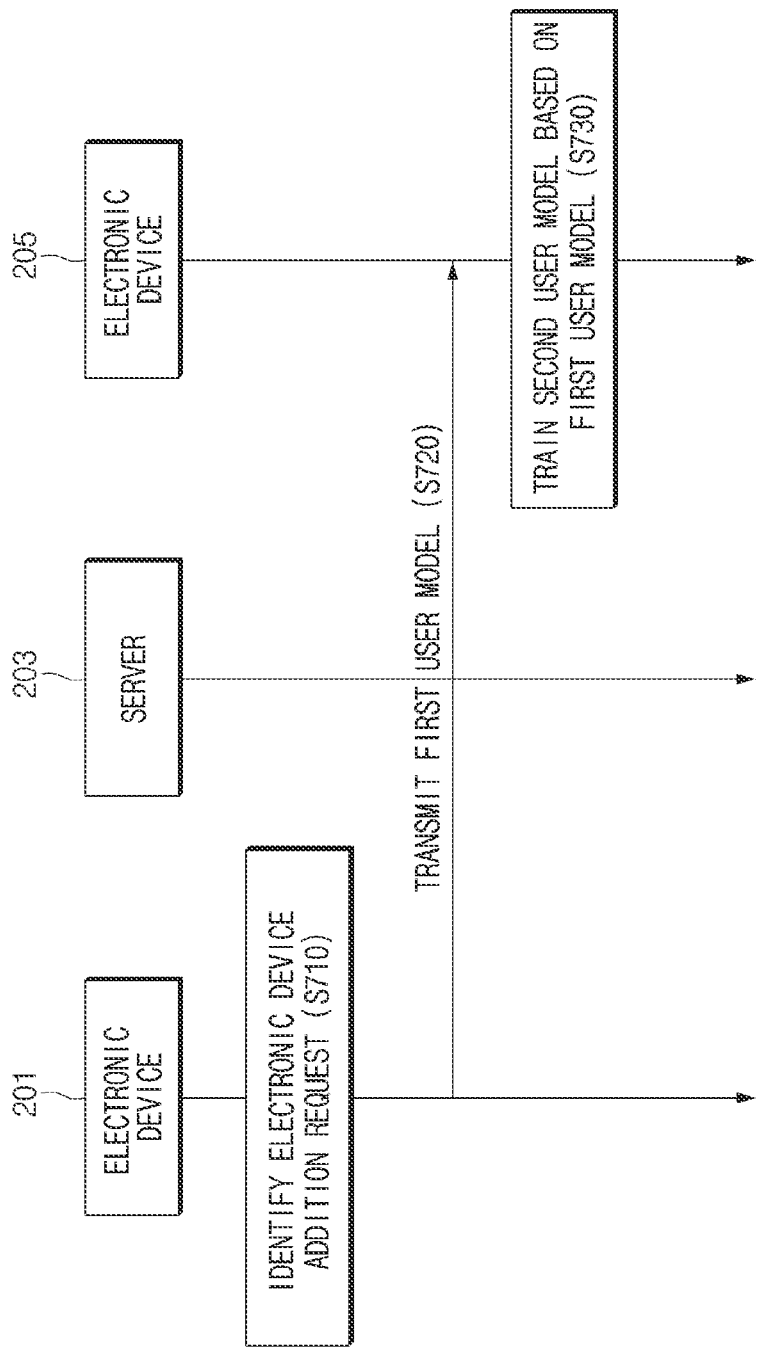
FIG. 7 illustrates an operation of transmitting a user model between electronic devices, according to an embodiment.

FIG. 7 illustrates an operation of transmitting a user model between the electronic devices 201 and 205, according to an embodiment.

Referring to FIG. 7, in step S710, the electronic device 201 may identify an electronic device addition request. According to an embodiment, the electronic device addition request may be generated based on a user input. According to an embodiment, the electronic device addition request may be generated by the electronic device 201 based on the user input. According to an embodiment, the electronic device addition request may be generated by an external device (e.g., the server 203 and the electronic device 205) based on the user input. According to an embodiment, the electronic device addition request generated by the external device may be delivered to the electronic device 201.

According to an embodiment, the electronic device 201 may identify the request for adding an electronic device to the electronic device 201. According to an embodiment, the electronic device 205 may be identifiable by the electronic device 201. According to an embodiment, the electronic device 205 may have a communication path with the electronic device 201 through a short-range communication network. According to an embodiment, the electronic device 205 may have the communication path with the electronic device 201 through the same access point. According to an embodiment, the electronic device 205 may be an IoT device. According to an embodiment, the electronic device 205 may include a portable communication device (e.g., a smartphone), a computer device, a portable multimedia device, a mobile medical appliance, a camera, a wearable device, a home appliance device, a smart speaker, or a combination thereof.

In step S720, the electronic device 201 may transmit a first user model (e.g., the user model 370) to the electronic device 205.

According to an embodiment, the electronic device 201 may directly transmit the user model 370 to the electronic device 205. According to an embodiment, the electronic device 201 may directly transmit the user model 370 to the electronic device 205 by using the established communication path between the electronic device 201 and the electronic device 205.

According to an embodiment, the electronic device 201 may indirectly transmit the user model 370 to the electronic device 205. According to an embodiment, the electronic device 201 may transmit the user model 370 to the server 203, and the server 203 may transmit the received user model 370 to the electronic device 205. According to an embodiment, the electronic device 201 may transmit a user model transfer request to the server 203, and the server 203 may transmit the user model 370 stored in the server 203 to the electronic device 205 in response to the user model transfer request.

According to an embodiment, the electronic device 205 may store the received first user model 370 in the memory 130 of the electronic device 205.

In step S730, the electronic device 205 may train a second user model 570 based on the first user model 370.

According to an embodiment, the electronic device 205 may train the user model 570 through a numerical computation (e.g., summation, average, or weighted average) between the first user model 370 and the second user model 570.

According to an embodiment, after step S730, the electronic device 205 may notify the electronic device 201 that the second user model 570 based on the first user model 370 is completely trained. According to an embodiment, a user of the electronic device 201 may perceive that a suitable speech recognition service is capable of being provided to the user through the electronic device 205, through a training completion notification.

Figure 8:
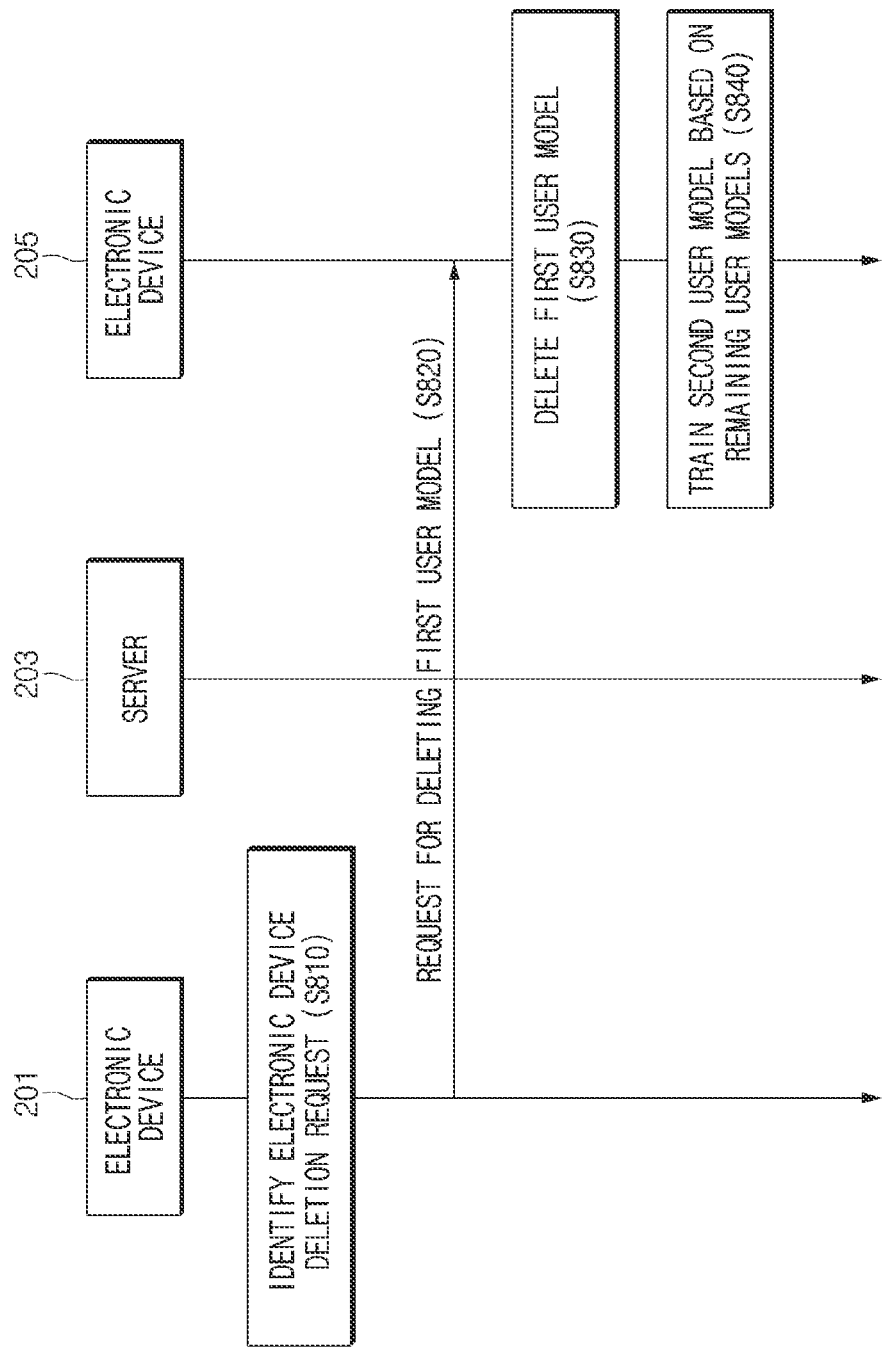
FIG. 8 illustrates an operation of deleting a user model between electronic devices, according to an embodiment.

FIG. 8 illustrates an operation of deleting a user model between the electronic devices 201 and 205, according to an embodiment.

Referring to FIG. 8, in step S810, the electronic device 201 may identify an electronic device deletion request. According to an embodiment, the electronic device deletion request may be generated based on a user input. According to an embodiment, the electronic device deletion request may be generated by the electronic device 201 based on the user input. According to an embodiment, the electronic device deletion request may be generated by an external device (e.g., the server 203 and the electronic device 205) based on the user input. According to an embodiment, the electronic device deletion request generated by the external device may be delivered to the electronic device 201.

In step S820, the electronic device 201 may request the electronic device 205 to delete the first user model.

According to an embodiment, the electronic device 201 may directly transmit a user model deletion request to the electronic device 205. According to an embodiment, the electronic device 201 may indirectly transmit the user model deletion request to the electronic device 205 through the server 203.

In step S830, the electronic device 205 may delete the first user model 370. According to an embodiment, the electronic device 205 may delete the user model 370 stored in a memory 130 of the electronic device 205.

In step S840, the electronic device 205 may train a second user model 570 based on the remaining user models. According to an embodiment, the remaining user models may be a user model of an electronic device to which the electronic device 205 is added (or registered).

According to an embodiment, the electronic device 205 may train the second user model 570 by using the remaining user models other than the first user model 370.

According to an embodiment, the electronic device 205 may train the second user model 570 through a numerical computation for excluding the contribution of the first user model 370 to the second user model 570. To this end, the electronic device 205 may perform step S830 after performing the numerical computation for excluding the contribution of the first user model 370 to the second user model 570.

According to an embodiment, after step S840, the electronic device 205 may notify the electronic device 201 of user deletion. According to an embodiment, a user of the electronic device 201 may perceive that only the general speech recognition service using the electronic device 205 is capable of being received through a user deletion notification.

Figure 9:
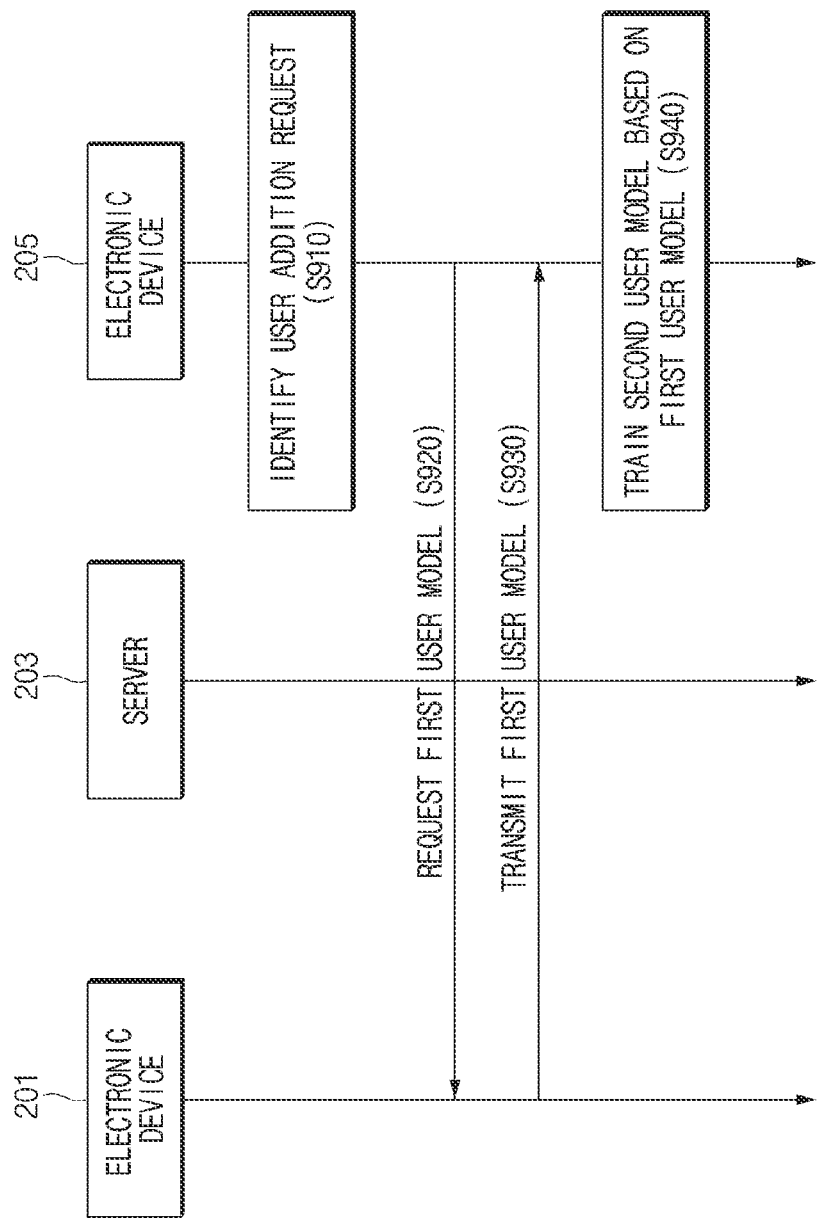
FIG. 9 illustrates an operation of transmitting a user model between electronic devices, according to an embodiment.

FIG. 9 illustrates an operation of transmitting a user model between the electronic devices 201 and 205, according to an embodiment.

Referring to FIG. 9, in step S910, the electronic device 205 may identify a user addition request. According to an embodiment, the user addition request may be generated based on a user input. According to an embodiment, the user addition request may be generated by the electronic device 205 based on the user input. According to an embodiment, the user addition request may be generated by an external device (e.g., the server 203 or the electronic device 201) based on the user input. According to an embodiment, the user addition request generated by the external device may be delivered to the electronic device 201.

In step S920, the electronic device 205 may make a request for a first user model 370 to the electronic device 201.

According to an embodiment, the electronic device 205 may directly transmit a user model request to the electronic device 201. According to an embodiment, the electronic device 205 may indirectly transmit the user model request to the electronic device 201 through the server 203.

According to an embodiment, the electronic device 205 may transmit the user model request to all electronic devices, in each of which a user is registered. According to an embodiment, the electronic device 205 may transmit the user model request to an electronic device 201, which is specified by the user, from among all electronic devices, in each of which the user is registered.

In step S930, the electronic device 201 may transmit the first user model 370 to the electronic device 205.

In step S940, the electronic device 205 may train a second user model 570 based on the first user model 370.

According to an embodiment, when the electronic device 205 receives two or more first user models (e.g., the user model 370), the electronic device 205 may integrate two or more first user models into one user model, and may train a second user model (e.g., the user model 570) based on the integrated user model. According to an embodiment, the integration into a user model may be performed through a numerical computation (e.g., summation, average, or weighted average) between two or more first user models.

According to an embodiment, after step S940, the electronic device 205 may notify the electronic device 201 that the second user model 570 based on the first user model 370 is completely trained. According to an embodiment, a user of the electronic device 201 may perceive that a suitable speech recognition service is capable of being provided to the user through the electronic device 205, through a training completion notification.

Figure 10:
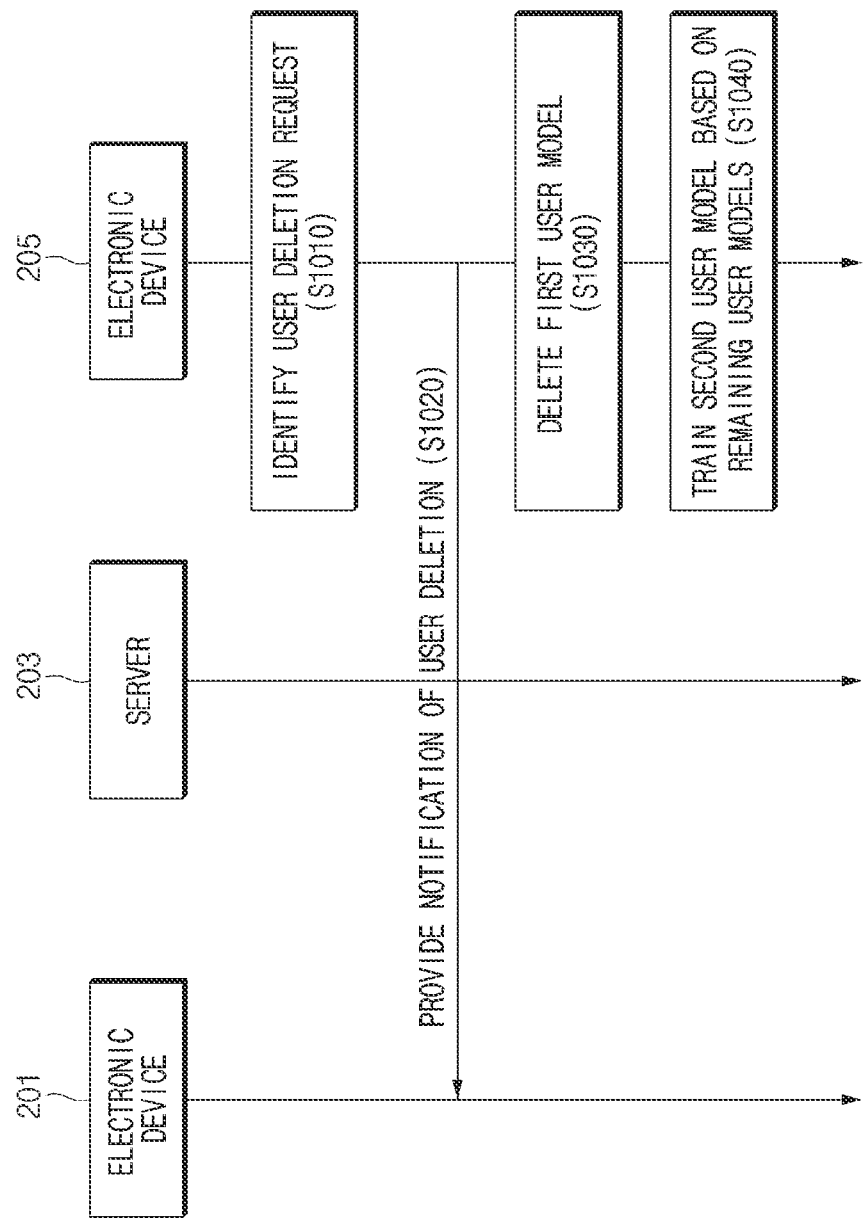
FIG. 10 illustrates an operation of deleting a user model between electronic devices, according to an embodiment.

FIG. 10 illustrates an operation of deleting a user model between the electronic devices 201 and 205, according to an embodiment.

Referring to FIG. 10, in step S1010, the electronic device 205 may identify a user deletion request. According to an embodiment, the user deletion request may be generated based on a user input. According to an embodiment, the user deletion request may be generated by the electronic device 205 based on the user input. According to an embodiment, the user deletion request may be generated by an external device (e.g., the server 203 or the electronic device 201) based on the user input. According to an embodiment, the user deletion request generated by the external device may be delivered to the electronic device 205.

According to an embodiment, the user deletion request may be generated by an input from an administrator of the electronic device 205. According to an embodiment, the administrator of the electronic device 205 may be the owner of the electronic device 205. According to an embodiment, the administrator of the electronic device 205 may be a user selected from among users registered in the electronic device 205. According to an embodiment, the administrator of the electronic device 205 may determine the permission, restriction, or combination of functions capable of being executed on the electronic device 205. According to an embodiment, the administrator of the electronic device 205 may determine the authority (e.g., whether to enable the functions executable on the electronic device 205) of a user registered in the electronic device 205.

In step S1020, the electronic device 205 may notify the electronic device 201 of user deletion.

According to an embodiment, the electronic device 205 may notify all electronic devices, which is registered by the user, of user deletion. According to an embodiment, the electronic device 205 may notify an electronic device (e.g., the electronic device 201) specified by the user among all electronic devices, in each of which a user is registered, of user deletion.

According to an embodiment, a user of the electronic device 201 may perceive that only the general speech recognition service using the electronic device 205 is capable of being received through a user deletion notification.

In step S1030, the electronic device 205 may delete a first user model 370.

In step S1040, the electronic device 205 may train a second user model 570 based on the remaining user models.

FIG. 10 illustrates that step S1020 is performed after step S1010, but this is only an example. According to an embodiment, step S1020 may be performed after step S1030 or step S1040.

Figure 11:
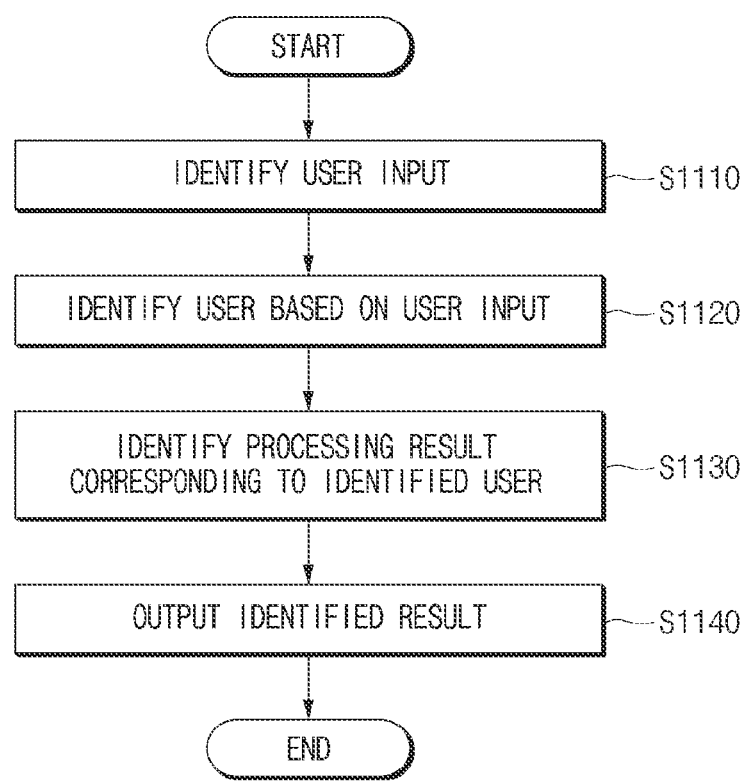
FIG. 11 illustrates an operation of processing a user input by an electronic device, according to an embodiment.

FIG. 11 illustrates an operation of processing a user input by the electronic device 201, according to an embodiment.

Referring to FIG. 11, in step S1110, the electronic device 201 may identify a user input (e.g., voice).

In step S1120, the electronic device 201 may identify a user based on the user input. According to an embodiment, the electronic device 201 may identify the user by using at least one user model 370 stored in the electronic device 201.

For example, when a user "David" utters a wakeup utterance (e.g., 'Hi Bixby'), the electronic device 201 may identify that the user who uttered the wakeup utterance is "David", by using the user model.

For example, when the user "David" utters a command (e.g., 'tell me the local weather'), the electronic device 201 may identify that "David" is the user who uttered the command, by using the user model.

In step S1130, the electronic device 201 may identify a processing result corresponding to the identified user.

According to an embodiment, the electronic device 201 may identify a function corresponding to the user's input by using the user model corresponding to the identified user.

According to an embodiment, when the identified user is not permitted to perform the identified function (e.g., execution of a video platform or access to a specified website), the electronic device 201 may identify the processing result that the function according to the user's input is incapable of being performed. According to an embodiment, the permission or restriction of the function for the user may be set in advance by an administrator of the electronic device 201. According to an embodiment, the permission or restriction of the function for the user may be set in advance in accordance with the policy of the electronic device 201 (e.g., a minor management policy).

According to an embodiment, when the identified user is permitted to perform the identified function, the electronic device 201 may perform a function according to a user's input.

According to an embodiment, the electronic device 201 may perform a function corresponding to the user's input by using a user model corresponding to the identified user. According to an embodiment, the electronic device 201 may perform a function corresponding to the user's input by using a user model, which corresponds to the identified user, from among a plurality of user models.

According to an embodiment, the electronic device 201 may perform a function corresponding to the user's input by using a user model corresponding to the identified user. According to an embodiment, the electronic device 201 may identify the processing result of a function corresponding to the user's input by using the user model corresponding to the identified user.

For example, the electronic device 201 may identify a function corresponding to a user utterance by entering the command uttered by the user into the user model for the identified user "David".

For example, the electronic device 201 may perform the identified function for the identified user "David".

In step S1140, the electronic device 201 may output the identified result.

According to an embodiment, the electronic device 201 may provide the user with the processing result of a function corresponding to the user's input through a specified module (e.g., the sound output module 155, the display module 160, the audio module 170, the haptic module 179, or a combination thereof).

According to an embodiment, when outputting the identified result, the electronic device 201 may output identification information (e.g., a name) of the identified user together.

For example, the electronic device 201 may output the processing result of the identified function together with a name for the identified user "David". The electronic device 201 may output a voice saying that "David, today's weather is 25 degrees". For example, when the identified user is not permitted to perform the identified function, the electronic device 201 may output a voice saying that "David, you are not allowed to perform the corresponding function".

It is described that the steps of FIG. 11 are performed through the electronic device 201. However, this is only an example. The steps of FIG. 11 may also be performed through the electronic device 205.

According to an embodiment of the disclosure, an electronic device (201, 205) may include a communication circuit (e.g., the communication module 190 of FIG. 1), the processor 120 electrically connected with the communication circuit, and the memory 130 electrically connected to the communication circuit and the processor 120 and storing a user model (370, 570) and instructions. When executed by the processor 120, the instructions may cause the electronic device (201, 205) to receive a first user model from another electronic device of a user registered in the electronic device (201, 205), through the communication circuit, to refine the user model (370, 570) based on the first user model, and to identify the user based on a first voice input of the user by using the refined user model (370, 570). The user model (370, 570) may be trained by the electronic device (201, 205) based on a second user model of at least one another user other than the user before the user is registered. The first user model may be trained by the other electronic device based on a second voice input of the user obtained by the other electronic device of the user.

According to an embodiment, when executed by the processor 120, the instructions may cause the electronic device (201, 205) to identify that a first user among at least one user registered in the electronic device (201, 205) is deregistered and to refine the user model (370, 570) such that an influence by a user model (370, 570) of the first user is removed from the user model (370, 570).

According to an embodiment, when executed by the processor 120, the instructions may cause the electronic device (201, 205) to identify a deregistration request for the first user, and to deregister the first user in the electronic device in response to the deregistration request. The deregistration request may be generated by at least one of a user input of the first user, an input from an external electronic device of the first user, or an input of an administrator of the electronic device.

According to an embodiment, when executed by the processor 120, the instructions may cause the electronic device (201, 205) to identify an authority for the user identified based on the first voice input and to determine whether to execute a function determined depending on the first voice input, based on the identified authority.

According to an embodiment, the authority for the user may be set by an administrator of the electronic device (201, 205).

According to an embodiment, when executed by the processor 120, the instructions may cause the electronic device (201, 205) to output identification information of the user when responding to the first voice input.

According to an embodiment, when executed by the processor 120, the instructions may cause the electronic device (201, 205) to receive at least some data 455 of a server model 451 from a server 203 by using the communication circuit and to refine the user model (370, 570) based on the received at least some data 455.

According to an embodiment, the first user model may be periodically received from the other electronic device.

According to an embodiment, when executed by the processor 120, the instructions may cause the electronic device (201, 205) to refine the user model (370, 570) through a weighted average between a weight of a plurality of layers included in the first user model and a weight of a plurality of layers included in the user model.

According to an embodiment, when executed by the processor 120, the instructions may cause the electronic device (201, 205) to refine the user model (370, 570) based on the first voice input, a function determined depending on the first voice input, or a combination of the first voice input and the function.

According to an embodiment of the disclosure, an operating method of an electronic device (201, 205) may include receiving a first user model from another electronic device of a user registered in the electronic device (201, 205), through a communication circuit (e.g., the communication module 190 of FIG. 1) of the electronic device (201, 205), refining a user model (370, 570) of the electronic device (201, 205) based on the first user model, and identifying the user based on a first voice input of the user by using the refined user model (370, 570). The user model (370, 570) may be trained by the electronic device (201, 205) based on a second user model of at least one another user other than the user before the user is registered. The first user model may be trained by the other electronic device based on a second voice input of the user obtained by the other electronic device of the user.

According to an embodiment, the operating method may further include identifying that a first user among at least one user registered in the electronic device (201, 205) is deregistered and refining the user model (370, 570) such that an influence by a user model (370, 570) of the first user is removed from the user model (370, 570).

According to an embodiment, the operating method may further include identifying a deregistration request for the first user and deregistering the first user in the electronic device (201, 205) in response to the deregistration request. The deregistration request may be generated by at least one of a user input of the first user, an input from an external electronic device of the first user, or an input of an administrator of the electronic device (201, 205).

According to an embodiment, the operating method may further include identifying an authority for the user identified based on the first voice input and determining whether to execute a function determined depending on the first voice input, based on the identified authority.

According to an embodiment, the authority for the user may be set by an administrator of the electronic device (201, 205).

According to an embodiment, the operating method may further include outputting identification information of the user when responding to the first voice input.

According to an embodiment, the operating method may further include receiving at least some data 455 of a server model 451 from a server 203 by using the communication circuit and refining the user model (370, 570) based on the received at least some data 455.

According to an embodiment, the first user model may be periodically received from the other electronic device.

According to an embodiment, the refining of the user model (370, 570) may include refining the user model (370, 570) through a weighted average between a weight of a plurality of layers included in the first user model and a weight of a plurality of layers included in the user model (370, 570).

According to an embodiment, the refining of the user model (370, 570) may include refining the user model (370, 570) based on the first voice input, a function determined depending on the first voice input, or a combination of the first voice input and the function.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a communication circuit;
a processor electrically connected with the communication circuit; and
a memory electrically connected to the communication circuit and the processor and configured to store a user model and instructions,
wherein the instructions, when executed by the processor, cause the electronic device to:
receive a first user model from another electronic device of a user registered in the electronic device, through the communication circuit;
refine the user model based on the first user model; and
identify the user based on a first voice input of the user by using the refined user model,
wherein the user model is trained by the electronic device based on a second user model of at least one another user other than the user before the user is registered, and
wherein the first user model is trained by the another electronic device based on a second voice input of the user obtained by the another electronic device of the user.

2. The electronic device of claim 1, wherein the instructions, when executed by the processor, cause the electronic device to:
identify that a first user among at least one user registered in the electronic device is deregistered; and
refine the user model such that an influence by a user model of the first user is removed from the user model.

3. The electronic device of claim 2, wherein the instructions, when executed by the processor, cause the electronic device to:
identify a deregistration request for the first user; and deregister the first user in the electronic device in response to the deregistration request, wherein the deregistration request is generated by at least one of a user input of the first user, an input from an external electronic device of the first user, or an input of an administrator of the electronic device.

4. The electronic device of claim 1, wherein the instructions, when executed by the processor, cause the electronic device to:

identify an authority for the user identified based on the first voice input; and determine, based on the identified authority, whether to execute a function that is determined depending on the first voice input.

5. The electronic device of claim 4, wherein the authority for the user is set by an administrator of the electronic device.

6. The electronic device of claim 1, wherein the instructions, when executed by the processor, cause the electronic device to:

output identification information of the user when responding to the first voice input.

7. The electronic device of claim 1, wherein the instructions, when executed by the processor, cause the electronic device to:

receive at least some data of a server model from a server by using the communication circuit; and refine the user model based on the received at least some data.

8. The electronic device of claim 1, wherein the first user model is periodically received from the another electronic device.

9. The electronic device of claim 1, wherein the instructions, when executed by the processor, cause the electronic device to:

refine the user model through a weighted average between a weight of a plurality of layers included in the first user model and a weight of a plurality of layers included in the user model.

10. The electronic device of claim 1, wherein the instructions, when executed by the processor, cause the electronic device to:

refine the user model based on the first voice input, a function determined depending on the first voice input, or a combination thereof.

11. An operating method of an electronic device, the method comprising:

receiving a first user model from another electronic device of a user registered in the electronic device, through a communication circuit of the electronic device;

refining a user model of the electronic device based on the first user model; and identifying the user based on a first voice input of the user by using the refined user model, wherein the user model is trained by the electronic device based on a second user model of at least one another user other than the user before the user is registered, and wherein the first user model is trained by the another electronic device based on a second voice input of the user obtained by the another electronic device of the user.

12. The method of claim 11, comprising:

identifying that a first user among at least one user registered in the electronic device is deregistered; and refining the user model such that an influence by a user model of the first user is removed from the user model.

13. The method of claim 12, comprising:

identifying a deregistration request for the first user; and deregistering the first user in the electronic device in response to the deregistration request, wherein the deregistration request is generated by at least one of a user input of the first user, an input from an external electronic device of the first user, or an input of an administrator of the electronic device.

14. The method of claim 11, comprising:

identifying an authority for the user that is identified based on the first voice input; and determining, based on the identified authority, whether to execute a function determined depending on the first voice input.

15. The method of claim 14, wherein the authority for the user is set by an administrator of the electronic device.

16. The method of claim 11, further comprising:

outputting identification information of the user when responding to the first voice input.

17. The method of claim 11, further comprising:

receiving at least some data of a server model from a server by using the communication circuit; and refining the user model based on the received at least some data.

18. The method of claim 11, wherein the first user model is periodically received from the another electronic device.

19. The method of claim 11, wherein refining the user model includes:

refining the user model through a weighted average between a weight of a plurality of layers included in the first user model and a weight of a plurality of layers included in the user model.

20. The method of claim 11, wherein refining the user model includes:

refining the user model based on the first voice input, a function determined depending on the first voice input, or a combination thereof.

* * * * *